(12) United States Patent
Jacob

(10) Patent No.: US 9,478,011 B2
(45) Date of Patent: Oct. 25, 2016

(54) METHOD AND SYSTEM FOR PROCESSING OF IMAGES

(75) Inventor: Stephane Jean Louis Jacob, Dubai Airport Free Zone (AE)

(73) Assignee: DOO Technologies FZCO, Dubai (AE)

( * ) Notice: Subject to any disclaimer, the term of this patent is extended or adjusted under 35 U.S.C. 154(b) by 758 days.

(21) Appl. No.: 12/600,899

(22) PCT Filed: Jan. 22, 2008

(86) PCT No.: PCT/IB2008/001376
§ 371 (c)(1),
(2), (4) Date: Mar. 24, 2010

(87) PCT Pub. No.: WO2008/142561
PCT Pub. Date: Nov. 27, 2008

(65) Prior Publication Data
US 2010/0189252 A1     Jul. 29, 2010

(30) Foreign Application Priority Data
May 21, 2007   (GB) .................................. 0709711.6

(51) Int. Cl.
*H04L 9/28*      (2006.01)
*G06T 3/40*      (2006.01)
*G06T 17/00*     (2006.01)
(Continued)

(52) U.S. Cl.
CPC .............. *G06T 3/4092* (2013.01); *G06T 17/00* (2013.01); *H04N 19/46* (2014.11); *H04N 19/59* (2014.11); *H04N 19/88* (2014.11); *G06T 2210/32* (2013.01)

(58) Field of Classification Search
CPC ... G06T 3/0018; G06T 3/4092; G06T 3/409; G06T 2210/32; H04N 19/00533; H04N 7/26265; H04N 19/88; H04N 19/46; H04N 19/59
USPC ...... 375/240; 348/426, 36; 386/328; 380/28; 382/428; 345/251
See application file for complete search history.

(56) References Cited

U.S. PATENT DOCUMENTS 5,241,382 A * 8/1993 Paik et al. ............... 375/240.25
5,430,486 A * 7/1995 Fraser et al. ............... 348/426.1
(Continued)

FOREIGN PATENT DOCUMENTS

EP   0546845   6/1993
EP   0596398   11/1994
(Continued)

OTHER PUBLICATIONS

Examination Report, JP Appln. No. 2010-508927 dated Apr. 25, 2013, 4 pgs.
(Continued)

*Primary Examiner* — William C Vaughn, Jr.
*Assistant Examiner* — Naod Belai
(74) *Attorney, Agent, or Firm* — Greenberg Traurig, LLP

(57) ABSTRACT

XHD video is acquired from a camera fitted with an ultra-wide field-of-view lens such as a fish eye lens. The active picture portion of the images are divided into patterns each having a plurality of pixels. The patterns are assigned coordinate values and then reformatted into HD format using an encryption key which reorders the patterns. The images are processed in the HD format and then returned to XHD formation by applying the reverse reordering process under the control of the key.

33 Claims, 4 Drawing Sheets

(51) Int. Cl.
   *H04N 19/46*   (2014.01)
   *H04N 19/59*   (2014.01)
   *H04N 19/88*   (2014.01)

(56) References Cited

U.S. PATENT DOCUMENTS

| | | | |
|---|---|---|---|
| 5,960,126 | A | 9/1999 | Nielsen et al. |
| 6,272,284 | B1* | 8/2001 | Sawada .................. 386/328 |
| 7,221,866 | B2* | 5/2007 | Clemens ............... G03B 17/00 |
| | | | 348/207.1 |
| 7,463,816 | B2* | 12/2008 | Tseng et al. .................. 386/353 |
| 8,208,549 | B2* | 6/2012 | Sasai et al. ............. 375/240.16 |
| 2007/0036222 | A1* | 2/2007 | Srinivasan et al. ...... 375/240.18 |
| 2009/0268046 | A1* | 10/2009 | Ogawa ...................... 348/222.1 |

FOREIGN PATENT DOCUMENTS

| | | |
|---|---|---|
| EP | 0633703 | 1/1995 |
| EP | 1764736 | 3/2007 |
| JP | 3-240368 | 10/1991 |
| JP | 2003141562 A | 5/2003 |
| JP | 2010508927 A | 3/2010 |
| WO | WO-95/17795 | 6/1995 |
| WO | WO 01/08412 | 2/2001 |
| WO | WO 2005/025205 | 3/2005 |

OTHER PUBLICATIONS

International Search Report No. PCT/IB2008/001376 dated Oct. 24, 2008, 3 pgs.

Search Report Under Section 17 for Appl. No. GB0709711.6, date of Search Sep. 28, 2007, 1 page.

Examination Report, JP Appln. No. 2010-508927 dated Jul. 5, 2012, 3 pgs.

* cited by examiner

Figure 3e
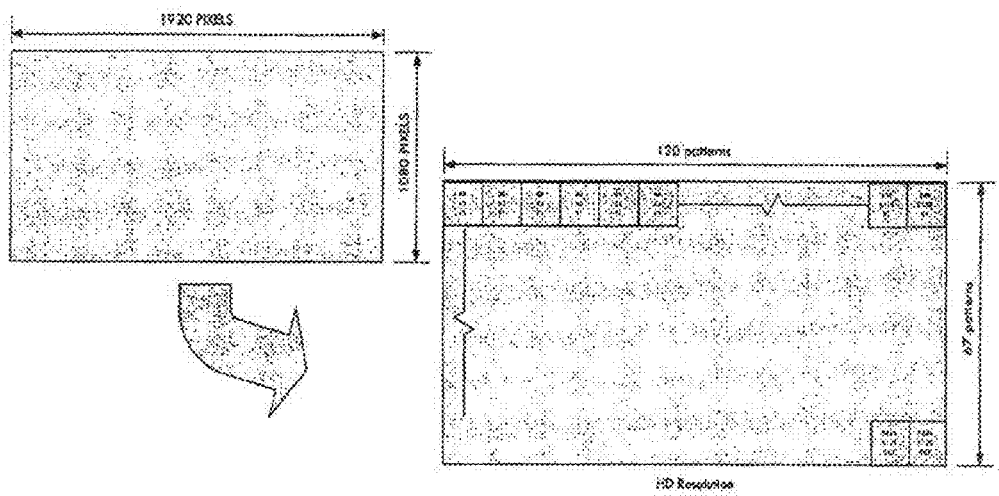
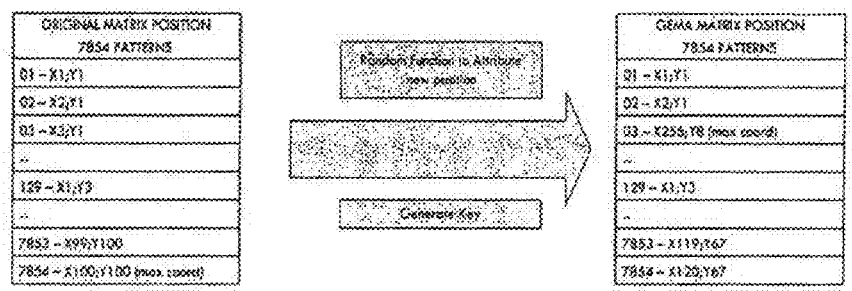
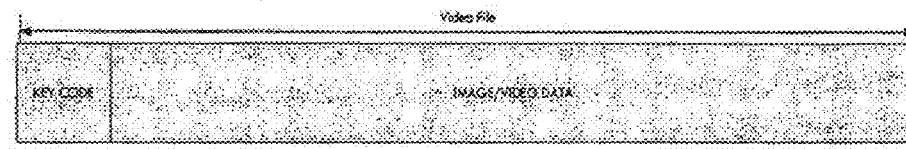
Figure 3f

METHOD AND SYSTEM FOR PROCESSING OF IMAGES

CROSS-REFERENCE TO RELATED APPLICATIONS

This application is a 371 of PCT Application No. PCT/IB2008/001376 filed on 22 Jan. 2008, which claims priority of Great Britain Patent Application No. 0709711.6 filed 21 May 2007. The teachings of these patents are hereby incorporated by reference in their entirety.

FIELD OF THE INVENTION

This invention relates to image processing and in particular, to processing images using different image formats.

BACKGROUND TO THE INVENTION

There have been many technological advances in recent years which have potential applications in the media industry. For example, digital image capture technologies have been, and are continuing to be, developed. It is desirable for the media industry to offer such new and innovative technologies which result in many new or improved applications.

One such developing area is that of interactive video. Interactive video generally allows a user to control the displayed area of a video; for example, the user may be able to zoom into an image. An example of interactive video is immersive video, which combines interactive panoramic photography with digital video.

Interactive panoramic photography combines photographic hardware with specific computer software to allow virtual display of a real environment captured previously as a photograph.

Immersive video has begun to address the technical problems associated with switching from static (360°) panoramic images to panoramic video.

Current technology enables a video sequence in immersive 3D mode to be viewed using a computer with which the user interacts via a peripheral such as a mouse, virtual head set, joystick or immersive panoramic screen or other input device.

The techniques used also make it possible to replace several standard cameras with a single immersive camera. This may be done by capturing ultra-wide field-of-view images. This is desirable for the user of the system, who can thus use the pan, tilt and zoom functions virtually, and can parameterise several virtual cameras. This leads to a more realistic experience for the user who can become more involved in the virtual environment, and leads to a variety of applications.

Ultra-wide field-of-view images can be captured using, for example, fish eye lenses. A fish eye lens has a wide-angle field-of-view. Many variants exist. A typical fish eye lens can form an image from a 180-degree hemisphere full circle. The images are typically captured, transported and viewed in High Definition (HD) resolution.

HD resolution video is characterised by its wide format (generally 16:9 aspect ratio) and its high image definition (1920×1080 pixels is a usual frame size, as compared with standard video definition (SD) formats where 720×576 pixel size is a usual frame size).

It is desirable to capture ultra-wide field-of-view images in very high definition (XHD) format. This can be achieved if the lens (for example a fisheye lens) is mounted on an appropriate camera. Very high definition (XHD) format achieves pictures of larger size than high definition (HD) format video. It is noted here, for the avoidance of doubt, that very high definition encompasses any definition higher than HD. The XHD formats are desirable, and sometimes necessary, in many video applications to allow the user to zoom correctly. For example, emerging cameras (using fish-eye lenses to take the pictures) are beginning to work beyond one megapixel and up to eight megapixels and beyond. Using XHD video greatly increases zoom capacity compared to HD video, allowing users to see well defined images even at high zoom, thereby greatly increasing the zoom range of emerging cameras and hence, in many applications, their effectiveness.

At present, the compression, transportation and storage of XHD resolution video obtained, for example, from cameras with fish eye lenses is performed by using MPEG compression which creates huge file sizes and bandwidth creating transportation and storage problems. Therefore, powerful dedicated processors and very-high-speed networks are required to enable the data to be compressed, transported and stored quickly enough to be available in real time for applications. These processors and networks are, at present, not widely available nor financially viable. Thus, fish eye XHD video cannot be offered to a wide market until these processors and networks are improved, become widely available and financially viable. Until then many applications cannot be realised. The present invention aims to address this problem generally.

SUMMARY OF THE INVENTION

According to the invention there is provided a method for processing images acquired at a first format for subsequent processing according to a second format, comprising: dividing at least part of images at the first format into a plurality of patterns, each pattern comprising a plurality of image pixels; reorganising the plurality of patterns to fit the second image format, the reorganising comprising mapping each pattern from its position in the first image format to a position in the second image format according to a control; processing images in the second format; and converting images back to the first format by reversing the mapping of the patterns applied in the reorganising step according to the control.

The invention also provides a system for processing images acquired at a first format for subsequent processing according to a second format, comprising: means for dividing at least part of images at the first format into a plurality of patterns, each pattern comprising a plurality of pixels; means for reorganising the plurality of patterns to fit the second image format, the reorganising comprising mapping each pattern from its position in the first image format to a position in the second image format according to a control; a processor for processing the images in the second format; and means for converting images back to the first format by reversing the mapping of the patterns applied in the reorganising step according to the control.

The invention further provides an encoder for encoding images in a first image format into a second image format, comprising: means for dividing at least part of images in the first format into a plurality of patterns, each pattern comprising a plurality of image pixels; means for reorganising the plurality of patterns to fit the second image format, the reorganising comprising mapping each pattern from its position in the first image format to a position in the second image format according to a control.

A decoder for use with the system described above comprising: means for converting images encoded at the second format back to the first format by reversing the mapping of the patterns applied on the reorganising step according to the control.

The inventor has appreciated that the problems described above may be avoided by converting very high definition (XHD) video into a commonly used format. HD format is the emerging commonly used format in the broadcast video sector (television, DVD etc.) and is beginning to become more popular within most corporate bodies that use video. A preferred embodiment uses HD as the commonly used format. Images having a greater amount of data can be rearranged into HD format and can be transported and processed without having to develop another Codec. Furthermore, the data can be stored using existing Codecs, for example H264 or DIVX. In a preferred embodiment XHD resolution video data acquired from fish eye lenses can be encoded into HD format, allowing widespread user access to fish eye XHD video without the need to develop bespoke technology.

While embodiments of the invention are advantageous in the handling of XHD ultra-wide field-of-view images, embodiments of the invention may also be used in a wide range of other applications where it is desirable to process an image according to a format other than the format in which the image was acquired.

The use of patterns enables an image to be reformatted without any loss of resolution. By using an encryption key to control the reorganisation of the patterns into the second format the video data may be made more secure. Alternatively a look-up table may be used to control reorganisation.

Preferably the patterns at the first and second formats have the same number of pixels. This has the advantage that resolution is not lost in the process of conversion between formats. Preferably all the patterns within an image have the same number of pixels.

Preferably a portion of the image is selected for division into patterns. This is advantageous where the image is a circular image such as obtained from a fish-eye lens. Only parts of the image that include active pixel data need be divided into patterns.

Preferably on dividing the images into patterns, each pattern is assigned a position reference, thereby facilitating reorganisation of the patterns between the first and second formats.

In one embodiment, the patterns are reorganised into more than one image of the second format. This enables resolution to be maintained even where the first format is a much greater resolution than the second format.

Preferably, the images at the second format are formed into data files which include the encryption key, enabling the image in the first format to be reassembled.

BRIEF DESCRIPTION OF THE DRAWINGS

An embodiment of the invention will now be described, by way of example only, and with reference to the accompanying drawings, in which:

FIGS. 3*a*-3*f* illustrate steps shown in FIG. 2 in more detail.

DESCRIPTION OF A PREFERRED EMBODIMENT OF THE INVENTION

The invention allows an image captured at a first format to be reformatted and processed in a second format and then converted back to the first format. In the following example the first format is a higher definition than the second format, but this need not be the case. It is preferred that the second format is a standard format, for example, High Definition or Standard Definition. The first format may be a standard or a non-standard format.

The embodiment to be described uses very high definition (XHD) video source, which may be taken using a wide-angle lens such as a fish eye lens. It should be appreciated that the embodiment is not limited to XHD images and the techniques to be described may be used in any environment where the image source is of a higher definition than the channel within which it is processed. In addition, although the embodiment is particularly useful for images acquired from fish eye, or from other ultra-wide field of view lenses, it is not limited to such images.

The video may be in real time or a file sequence. In this example, the video is taken using a camera imager producing images of 1600×1600 pixels. This camera imager may be a 360×180 camera, which captures circular images of 180° hemisphere view. Cameras that produce XHD video could have many applications. The wide view XHD images are particularly desirable since the high-resolution images captured allow the user to view well-defined images even at high zoom. Thus improving the detail of the environment that can be viewed and greatly increasing the zoom ability and therefore, in many uses, the effectiveness of the camera.

Figure 1:
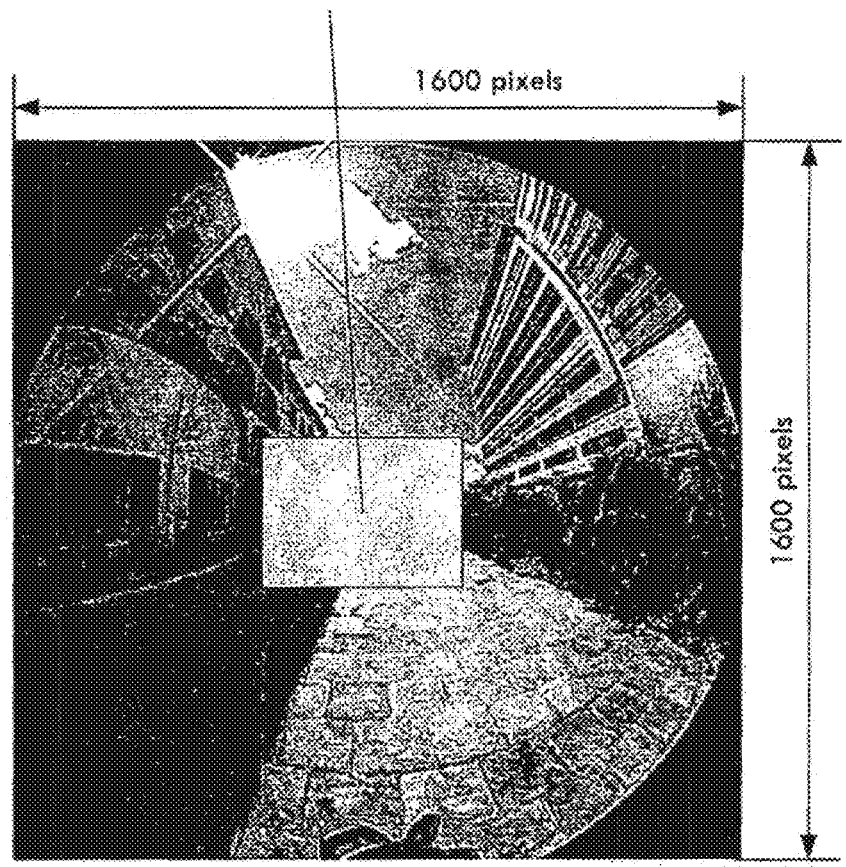
FIG. 1 is illustrative of a raw digital fisheye image from a 360×180 field-of-view camera.

FIG. 1 shows an XHD image that has been acquired using a XHD digital camera and a fish eye lens. The image is 1600×1600 pixels. In the image, a portion near the centre has been selected for the user to zoom into. It is important that image quality is preserved during digital zooming.

Figure 2:
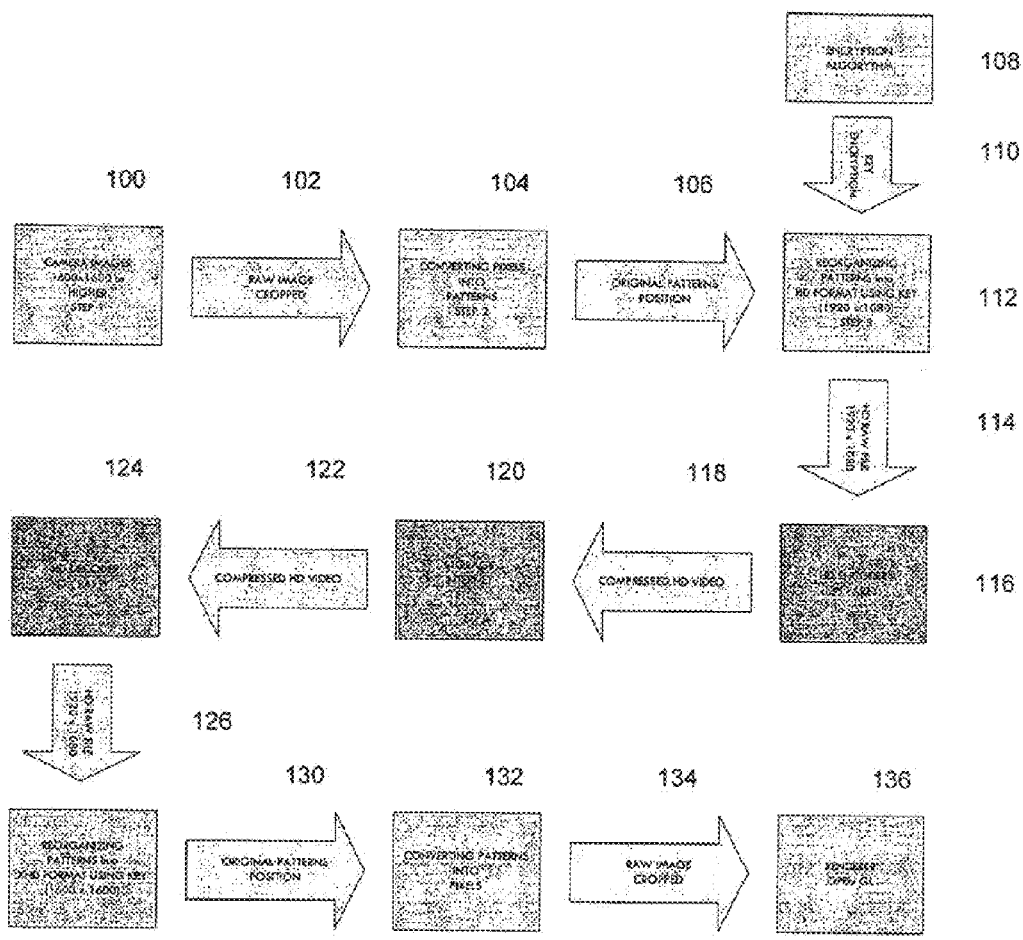
FIG. 2 is a schematic overview of an embodiment of the invention.
Figure 3A:
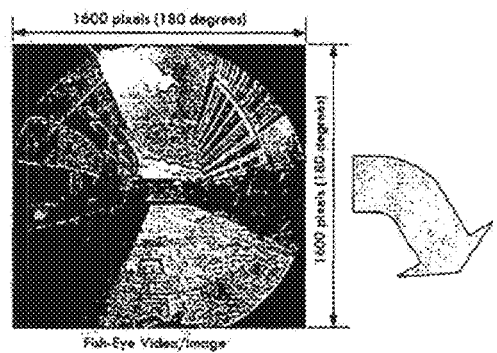
Figure 3B:
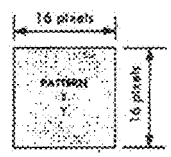

FIG. 2 shows an overview of the steps involved in image acquisition and processing embodying the invention. This figure will now be described with reference also to FIGS. 3*a* and 3*f* which illustrate some of the steps in greater detail.

FIG. 2 shows the steps involved in acquiring and encoding an XHD fisheye video source into a commonly used resolution format. In this embodiment the commonly used format is HD resolution. The pixels that make up the images to be encoded are divided into blocks or patterns. The patterns are then reorganized into HD resolution format as will be described. In this embodiment the HD format is size 1920×1080 pixels. In HD format the XHD fish eye video data can then be compressed, for example, for transportation and/or storage.

The patterns are preferably made up of a predetermined number of pixels. Preferably all the patterns are made up of the same number of pixels. Defining patterns has the advantage that the pattern format may comply with existing commonly used encoding standards. Thus the encoding process may be simplified and be more financially viable. It is presently preferred, as shown in FIG. 3, that each pattern is a square of size 16 pixels×16 pixels.

Preferably, only the desired image to be encoded is defined into patterns. In this example the fish eye image is a circular image with black outside making up the square image. We define the size of the square for this embodiment, 1600 pixels×1600 pixels, as that defined when the circle touches the square once on each of its sides. This black region outside the circle has no image data and is therefore not defined into patterns. This saves storage space and increases total transportation time when one desires to transport or store the encoded video data. At the edge of the image area, some patterns will be included which are partly image pixels and partly non-image pixels.

Figure 3C:
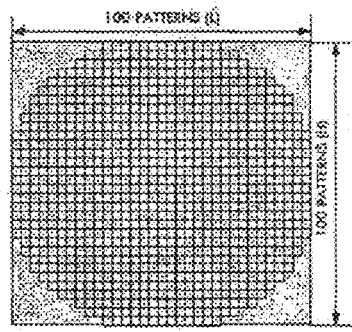
Figure 3D:
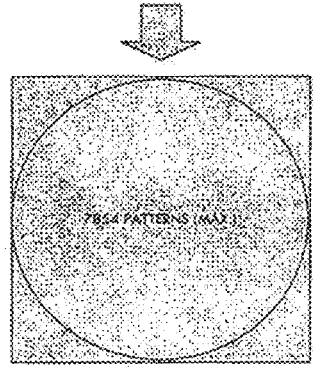

All sides of a given pattern adjoin a side of another pattern except for those sides on patterns at the edge of the active image to be encoded. For the original square image size of 1600×1600 pixels the image could be defined by 100×100 patterns each of 16×16 pixels. Where the image has been acquired through a circular lens, as in the example shown, it is defined by fewer patterns with only the active area of the image being defined into patterns. If the image is circular with sides touching the edge of the defined square image size, as in this embodiment, the area of defined patterns is calculated to be 7854 patterns. This is illustrated in FIGS. 3c and 3d.

Each pattern is assigned a pattern number and an x,y coordinate position in the matrix of patterns. This coordinate information is stored and is illustrated in FIG. 3d. A commonly used encoding standard, such as the encoding standard (Frame P) in the MPEG1, MPEG 2 and MPEG4 standards is used to define the pixels into patterns. A P frame is one that is encoded with reference to a past frame. An encoder searches for differences between a given image and a previous image on a block by block basis. These blocks are called macroblocks, which are superimposed on the previous image. The present embodiment maps the patterns onto the macroblock structure.

Within the MPEG standards, an algorithm compares the two images block by block and beyond a certain difference threshold it considers the block of the previous image to be different from that of the current image and applies a JPEG compression to the block of the present image.

As is explained below, the embodiment maps the patterns of the image of FIG. 3c onto the macroblocks of an MPEG high definition image and produces a key which defines the position to which each pattern is mapped and which can be used to reassemble the image after further processing. Referring back to FIG. 2, the image is acquired by the camera at 100 and the image cropped at 102 to remove the black portions outside the circular image. At 104 the image is converted into the set of patterns shown in FIG. 3b and at 106 the relative position of each pattern is recorded. An encryption algorithm 108 is used to generate an encryption key.

As shown at 112 in FIG. 2 an encryption key is used to reorganize the patterns to fit the commonly used resolution format. The HD resolution format, in this embodiment, is 1920×1080 pixels. This format can fit 120 patterns×67 patterns of the 16 pixel patterns defined from the 1600×1600 pixel image. Therefore, all the defined patterns of the original fish eye XHD image can be fitted into the HD format. An advantage of this method is that the video source, which is to be defined into patterns, is not degraded when it is encoded into HD format. That is each pixel in the area of the image defined into patterns is present when the patterns are reorganised into the commonly used format. 1 pixel defined in a pattern in the video data=1 pixel defined in a pattern in the commonly used format resolution. This is desirable for multiple applications where all the information is important and the user may wish to zoom into, pan and tilt the image. It will be appreciated from FIG. 3 that the XHD image has been divided into 7854 patterns whereas the HD format can accommodate up to 120×67=8040 patterns. Thus, the patterns of the XHD image can comfortably fit within a single HD frame. If the resolution of the XHD image was higher, such that there were more patterns in the XHD image than a single HD frame, the XHD image could be spread over two or more HD image frames.

As can be seen from FIG. 3d the original position of each pattern is allocated a matrix position which is then stored. The positions are mapped into the HD format. A random function attributes a new position to each pattern using the encryption key. This key may be sent with the video data to facilitate decoding the video data. This is illustrated in FIG. 3e. In an alternative, the patterns position information is encrypted in the encoder and decoder thereby making it possible, once the data has been transferred, to reconstitute the original image.

Returning to FIG. 2, a raw 1920×1080 pixel HD image is produced and sent, at 114, to an HD encoder 116. This image data is shown in FIG. 3f as a video file which includes video data and an encryption key code.

This HD image may be compressed using conventional techniques, such as an MPEG or JPEG algorithm as shown at 118 and may be stored, transported, manipulated or otherwise processed in that compressed format as shown at 120. Following manipulation, the compressed data, at 122 is passed to a conventional HD decoder 124 which extracts the raw 1920×1080 pixel file 126 for each frame. At 128, the encryption key is received and the original XHD image can be reassembled based on the encryption key and the known coordinates in the starting image of each pattern. Thus, at 128 the patterns are reorganised in to the XHD format using the key to give the original patterns position at 130. At 132 the patterns are converted back into image data pixels and at 134 the raw cropped image is produced. The image may now be rendered as required as shown at 136.

The encoded video data as a HD raw file of pixels 1920×1080 can be encoded using a third party, for example using an existing encoder such as H264 or DIVX. The skilled person will appreciate that many other HD encoders could be used, including those in development or those not yet conceived of which achieve the purpose. Thus a conventional HD encoder can be used to compress the HD format XHD fish eye video. In this compressed form the video can be transported and/or stored, for example using Internet storage. Details of encoding HD video, transporting and storing HD video, and encoders for carrying out the functions, are well known in the art. Similarly, a conventional HD decoder can then be used to decode and decompress the compressed HD format XHD wide-angle field-of-view video. HD decoders are also well known in the art.

The embodiment described has the advantage that a non-standard source can be compressed and decompressed, and therefore transported and stored in a commonly used format. This is greatly advantageous for the user and enables sources such as XHD fish eye video data to be compressed and decompressed using commonly used encoders and decoders, in this embodiment HD encoders and decoders. This enables XHD video data to be transported and stored without the need for new XHD video data codecs to be developed. Powerful dedicated processors and very-high-speed networks which are not widely available or presently financially viable are also not required. Thus the embodiment enables the use of XHD wide-angle field-of-view video sources in multiple applications.

In a preferred application of the invention the video data is encrypted differently during transport and storage of the data. This may lead to the video data being more secure.

It will be appreciated by the skilled person that examples of use of the invention are for illustration only and that the invention could be utilised in many other ways. It will also be appreciated that video image size may vary from the disclosed example and that the image pixels could fit into an appropriate number of patterns of appropriate pattern size to fit the commonly used resolution format. This may be HD or some other format such as standard definition (SD). Where necessary, the patterns of the source image may be mapped onto two or more images at the lower resolution.

The skilled person will also appreciate that the number of pixels in each pattern may vary depending on requirements of the commonly used resolution format or encoding technology.

Various other modifications to the embodiments described are possible and will occur to those skilled in the art without departing from the scope of the invention which is defined by the following claims.

The invention claimed is:

1. A method for processing images acquired at a first resolution format for subsequent processing according to a second resolution format, comprising:
dividing at least part of an image at the first resolution format into a plurality of patterns, each pattern comprising a plurality of image pixels;
reorganizing the plurality of patterns into an image at the second resolution format without any loss of resolution, the image at the second resolution format comprising the plurality of patterns of the at least part of the image at the first resolution, the patterns at the first resolution format and the second resolution format having the same number of image pixels, the reorganizing comprising mapping each pattern from its position in the first resolution format to a position in the second resolution format according to a control, wherein the first resolution format is a higher resolution format than the second resolution format;
processing the images in the second resolution format; and
converting the images in the second resolution format back to the first resolution format by reversing the mapping of the patterns applied on the reorganizing step according to the control.

2. A method according to claim 1 wherein the control is an encryption key.

3. A method according to claim 2, wherein the patterns in the second resolution format are processed as data files or a data stream which includes the encryption key, whereby the images can be converted back to the first resolution format.

4. A method according to claim 1 wherein the control is a look-up table.

5. A method according to claim 1, wherein all patterns of the first resolution format images have the same number of pixels.

6. A method according to claim 1, wherein the step of dividing the image into a plurality of patterns comprises selecting a portion of the image area to be divided into patterns.

7. A method according to claim 6, wherein the image source is an ultra-wide field-of-view lens and wherein the portion of the image selected corresponds to an active picture area.

8. A method according to claim 6, wherein the un-selected portion of the image comprises non-image pixels.

9. A method according claim 1, wherein the step of dividing the images comprises assigning a position reference to each pattern.

10. A method according to claim 9, wherein the reorganizing of the patterns comprises mapping the position references of the patterns to a new position in the second resolution format image.

11. A method according to claim 1, wherein the first resolution format is of higher resolution than High Definition (HD).

12. A method according to claim 1, wherein the second resolution format is High Definition (HD).

13. A method according to claim 1, wherein the images are video images.

14. A method according to claim 1, wherein the images are acquired from a single image source.

15. A method according to claim 1, wherein the images are acquired from multiple image sources.

16. A system for processing images acquired at a first resolution format for subsequent processing according to a second resolution format, comprising:
a divider for dividing at least part of an image at the first resolution format into a plurality of patterns, each pattern comprising a plurality of pixels;
a reorganizer for reorganizing the plurality of patterns into an image at the second resolution format without any loss of resolution, the image at the second resolution format comprising the plurality of patterns of the at least part of the image at the first resolution, the patterns at the first resolution format and the second resolution format having the same number of image pixels, the reorganizing comprising mapping each pattern from its position in the first resolution format to a position in the second resolution format according to a control, wherein the first resolution format is a higher resolution format than the second resolution format;
a processor for processing the image in the second resolution format: and
a converter for converting the image in the second resolution format back to the first resolution format by reversing the mapping of the patterns applied in the reorganizing step according to the control.

17. A system according to claim 16, wherein the control is an encryption key.

18. A system according to claim 17, wherein the processor processes patterns in the second resolution format as data files which include the encryption key, whereby the images can be converted back to the first resolution format.

19. A system according to claim 16, wherein the control is a look-up table.

20. A system according to claim 16, wherein all patterns of the first resolution format images have the same number of pixels.

21. A system according to claim 16, wherein the step of dividing the image into a plurality of patterns comprises selecting a portion of the image area to be divided into patterns.

22. A system according to claim 21, wherein the image source is an ultra-wide field of view lens and wherein the portion of the image selected corresponds to an active picture area.

23. A system according to claim 21, wherein the un-selected portion of the image comprises non-image pixels.

24. A system according to claim 16, wherein the step of dividing the images comprises assigning a position reference to each pattern.

25. A system according to claim 24, wherein the reorganizing of the patterns comprises mapping the position references of the patterns to a new position in the second resolution format image.

26. A system according to claim 16, wherein the first resolution format is of higher resolution than High Definition (HD).

27. A system according to claim 16, wherein the second resolution format is High Definition (HD).

28. A system according to claim 16, wherein the first resolution format is a higher resolution format than the second resolution format.

29. A system according to claim 16, wherein the images are video images.

30. A system according to claim 16, wherein the images are acquired from a single image source.

31. A system according to claim 16, wherein the images are acquired from multiple image sources.

32. An encoder for encoding images in a first resolution format into a second resolution format, comprising:
    a divider for dividing at least part of an image in the first resolution format into a plurality of patterns, each pattern comprising a plurality of image pixels; and
    a reorganizer for reorganizing the plurality of patterns into an image at the second format without any loss of resolution, the image at the second resolution format comprising the plurality of patterns of the least part of the image in the first resolution, the patterns at the first resolution format and the second resolution format having the same number of image pixels, the reorganizing comprising mapping each pattern from its position in the first resolution format image to a position in the second resolution format image according to a control, wherein the first resolution format is a higher resolution format than the second resolution format;
    a processor for processing the image in the second resolution format: and a converter for converting the image in the second resolution format back to the first resolution format by reversing the mapping of the patterns applied in the reorganizing step according to the control.

33. A decoder for use with an encoder according to claim 32 comprising:
    a real-time converter for converting images encoded at the second resolution format back to the first resolution format by reversing the mapping of the patterns applied in the reorganizing step according to the control.

\* \* \* \* \*